United States Patent [19]

Lanton, Jr.

[11] 4,262,169
[45] Apr. 14, 1981

[54] AERIAL CABLE GUARD

[76] Inventor: Ralph H. Lanton, Jr., 5100 Wallingford Dr., St. Louis, Mo. 63121

[21] Appl. No.: 119,864

[22] Filed: Feb. 8, 1980

[51] Int. Cl.³ .............................................. H02G 7/00
[52] U.S. Cl. ...................... 174/136; 52/101; 119/97 AR; 174/41; 256/12
[58] Field of Search ............... 174/5 R, 40 R, 40 TD, 174/41, 70 R, 70 A, 135, 136, 139; 49/58; 52/101; 119/97 AR; 191/35; 211/119.18; 256/12; 273/127 D, 392

[56] References Cited

U.S. PATENT DOCUMENTS

| | | | |
|---|---|---|---|
| 321,171 | 6/1885 | Archibald | 256/12 |
| 511,701 | 12/1893 | Jacobs | 119/97 AR X |
| 861,559 | 7/1907 | Trost | 256/12 |
| 1,805,859 | 5/1931 | White | 119/97 AR X |
| 2,344,367 | 3/1944 | Pueschel | 119/97 AR X |
| 2,347,418 | 4/1944 | Kravick | 119/97 AR X |
| 2,671,429 | 3/1954 | Hart | 119/97 AR X |
| 3,641,251 | 2/1972 | Liao | 174/40 R |
| 3,772,451 | 11/1973 | Canavan et al. | 174/41 |
| 4,159,395 | 6/1979 | Cogelia | 174/136 |

FOREIGN PATENT DOCUMENTS

| | | | |
|---|---|---|---|
| 661620 | 4/1963 | Canada | 119/97 AR |
| 21097 | 3/1916 | Denmark | 174/139 |
| 546971 | 2/1977 | U.S.S.R. | 52/101 |

*Primary Examiner*—Laramie E. Askin
*Attorney, Agent, or Firm*—Neal Kalishman

[57] ABSTRACT

A cable guard having a cover which rotates about an aerial cable when stepped upon by an animal. A weight maintains the cover in an upright position when no animals are on the cover.

10 Claims, 2 Drawing Figures

AERIAL CABLE GUARD

BACKGROUND OF THE INVENTION

I. Field of the Invention

The invention relates to cable guards which protect cables from sheath-chewing animals. Specifically, the invention is concerned with a cable guard that protects telecommunication cables from squirrels.

II. Description of the Prior Art

A common problem in the utility industry, and the telecommunications segment in particular, is the damage of aerial cables by squirrels and other sheath-chewing animals. The problem is not isolated to particular communities but is widespread throughout the United States. It is natural for squirrels to chew on branches, cables, etc. as a means of conditioning their teeth.

Solutions to this problem have been proposed but have proved ineffective. A typical proposal is that which is described in U.S. Pat. No. 4,159,395 to Cogelia and which is incorporated by reference herein. The guard of the prior art is an inverted V-shaped body which rests on the cable and its supporting strand. This type of guard has not been effective in stopping animals from chewing on the cable. Instead it has only slowed the animals since it proves merely another layer through which to chew. Thus, the guard does not solve the problem.

The present invention is advantageous in that it provides a cable guard which prevents animals from gaining access to an aerial cable. Also, it is easily installed by workmen without the use of ladders. Further, the unit will automatically return to a ready position when no animal is on its top surface.

SUMMARY OF THE INVENTION

The present invention provides a cable guard for protecting an aerial cable comprising a cover means for covering the cable, a rotational means for allowing the rotation of said cover means about the cable and a balancing means for controlling the position of said cover means through said rotational means.

DESCRIPTION OF THE PREFERRED EMBODIMENTS

Figure 1:
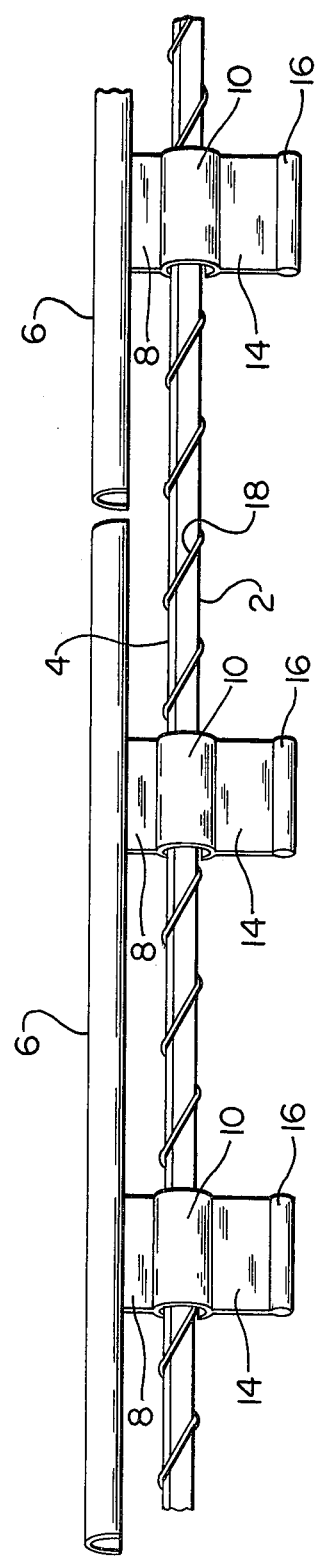
FIG. 1 shows the cable guard of the invention affixed to a conventional aerial cable.
Figure 2:
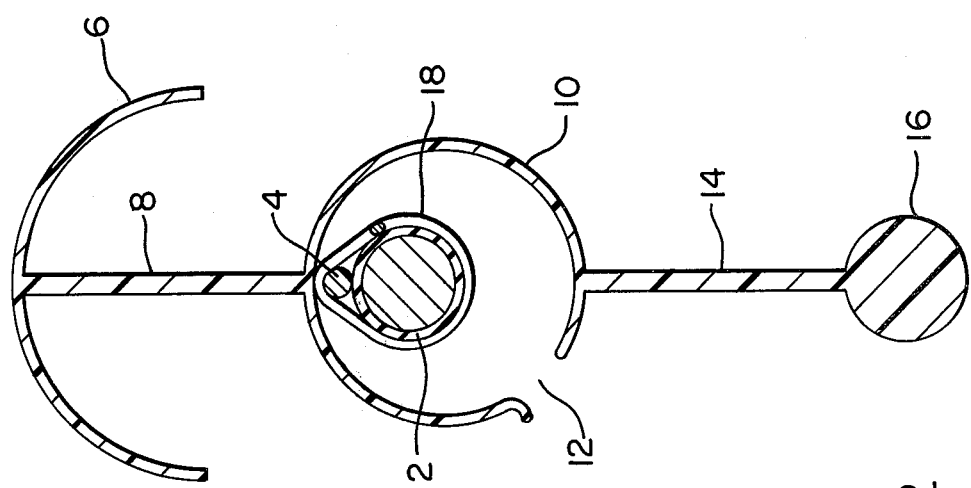
FIG. 2 is a transverse cross-section of the cable guard affixed to a conventional aerial cable.

Referring to FIGS. 1 and 2 a utility cable animal guard is shown. It is illustrated with particular reference to a telephone cable 2 and its support strand 4 and lashing wire 18; however, the invention is not limited to any particular type of cable or cable support arrangement. The guard comprises a cover means attached to a rotational means that is attached to a balancing means which controls the position of the cover means through the rotational means.

The cover means comprises a roof element 6 and an arm support 8. The shape of the roof 6 is preferably semicircular or tent-like. The size of the roof 6 is not crucial although it is usually larger than the cable it is protecting. The roof 6 may be of either metal or plastic construction. The arm support 8 may also be made from plastics or metals. The length of the support should be sufficient to allow for rotation of roof 6 about the cable 2 and strand 4. Also, the length must not be too great in order to maintain the roof 6 close enough to the cable 2 and strand 4 to prevent small animals from crawling under the roof.

The rotational means comprises an open ring 10 which fits over the cable 2 and strand 4. The ring 10 is preferably made from non-rigid material in order that the access opening 12 can be opened during installation to allow the ring 10 to snap over the cable 2 and strand 4. The ring 10 should have sufficient clearance about the cable 2 and strand 4 to permit free rotation.

The balancing means comprises an arm 14 and a weight 16. The length and construction material of arm 14 will be dependent upon the weight 16. The construction of weight 16 will be dependent upon the characteristics of the cover means. The important design feature of the balancing means is that when no animal is on the roof 6, the device remains in a balanced upright position and that when an animal goes on to the roof 6, the device becomes unbalanced and rotates about the cable 2 and strand 4. Using the aforementioned principle as a guide, the specific design of the balancing means becomes one of choice.

The roof 6 may be supported by more than one arm 8, ring 10, arm 14 and weight 16 units. When multiple rings 10 are used to support one roof 6, some of the rings 10 may not require the use of weights 16 to maintain the position of the roof 10. The balancing means should be weighted in order to allow rotation of the device when greater than a specified force or weight is applied to the cover means. This force will usually be the weight of animals common to the area.

When an animal steps onto the roof 6, the unit becomes unbalanced. As it begins to rotate about the cable 2 and strand 4, the animal will jump back to the tree or pole from which it came. The device then returns to its upright rest position. Since the rotation begins almost immediately upon the application of force, animals do not have sufficient time to chew on the cable. Thus, the cable is protected from animals and service does not get interrupted due to animals chewing on the lines.

The unit can be installed without climbing by workmen from the ground. Also, since the roof 6 is elevated above the cable 2 and strand 4, access to the cable for workers is not hampered.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A cable guard for protecting an aerial cable comprising:
    (a) a cover means for covering the aerial cable;
    (b) a rotational means for allowing the rotation of said cover means about the cable; and
    (c) a balancing means for controlling the position of said cover means through said rotational means.

2. The cable guard of claim 1 wherein said cover means comprises a roof and arm combination.

3. The cable guard of claim 1 wherein said rotational means comprise a ring.

4. The cable guard of claim 3 wherein said ring has an opening.

5. The cable guard of claim 4 wherein said ring is made from non-rigid material.

6. The cable guard of claim 1 wherein said balancing means comprises a weight attached to an arm.

7. A cable guard for protecting an aerial cable comprising a ring having an open section, a roof attached to said ring by an arm, and a weight attached to said ring by an arm.

8. The cable guard of claim 7 wherein said roof has at least two arms attached to said ring.

9. The guard of claim 8 wherein said arms are attached to at least two rings.

10. The guard of claim 9 wherein each of said rings has a weight attached thereto.

* * * * *